(12) United States Patent
Feng et al.

(10) Patent No.: US 8,089,917 B2
(45) Date of Patent: Jan. 3, 2012

(54) METHOD, SYSTEM AND APPARATUS OF IMPLEMENTING INTER-SYSTEM COMMUNICATIONS

(75) Inventors: Shulan Feng, Shenzhen (CN); Jinnan Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/505,358

(22) Filed: Jul. 17, 2009

(65) Prior Publication Data

US 2009/0285088 A1    Nov. 19, 2009

Related U.S. Application Data

(63) Continuation of application No. PCT/CN2008/070393, filed on Mar. 3, 2008.

(30) Foreign Application Priority Data

Mar. 9, 2007    (CN) .......................... 2007 1 0088038
Apr. 4, 2007    (CN) .......................... 2007 1 0090329

(51) Int. Cl.
    *H04B 7/17*    (2006.01)
    *H04W 4/00*    (2009.01)
(52) U.S. Cl. ........................................ 370/315; 370/328
(58) Field of Classification Search .................. None
    See application file for complete search history.

(56) References Cited

U.S. PATENT DOCUMENTS

2008/0051087 A1\*    2/2008    Ryu et al. ...................... 455/436

FOREIGN PATENT DOCUMENTS

CN    1918924 A    2/2007

OTHER PUBLICATIONS

Written Opinion of the International Searching Authority in corresponding PCT Application No. PCT/CN2008/070393 (Jun. 19, 2008).
"IEEE Std 802.16h-2010-Amendment 2: Improved Coexistence Mechanisms for License-Exempt Operation," Part 16: Air Interface for Broadband Wireless Access System, 2010, pp. 1-201, IEEE Standard for Local and metropolitan area networks, New York, New York.

\* cited by examiner

*Primary Examiner* — Kevin C Harper
(74) *Attorney, Agent, or Firm* — Leydig, Voit & Mayer, Ltd.

(57) ABSTRACT

Methods for implementing inter-system communications includes as follows: a serving base station selects a relay terminal, transmits a neighboring base station access request to the selected relay terminal; the relay terminal receives the neighboring base station access request, and accesses a neighboring base station; the relay terminal receives relay information, and communicates with the serving base station or the neighboring base station based on the relay information. Systems and apparatuses for implementing inter-system communications are also disclosed. With the methods, systems and apparatuses of the embodiments of the present disclosure, the probability of correct receipt of relay information at the neighboring base station may be improved.

13 Claims, 5 Drawing Sheets

METHOD, SYSTEM AND APPARATUS OF IMPLEMENTING INTER-SYSTEM COMMUNICATIONS

CROSS-REFERENCE TO RELATED APPLICATIONS

The present application is a continuation of International Patent Application No. PCT/CN2008/070393, filed on Mar. 3, 2008, which claims the benefit of Chinese Patent Application Nos. 200710088038.9, filed on Mar. 9, 2007 and 200710090329.1, filed on Apr. 4, 2007, all of which are hereby incorporated by reference in their entireties.

FIELD OF THE INVENTION

The present disclosure relates to mobile communication techniques, and more particularly, to methods, systems and apparatuses for implementing inter-system communications.

BACKGROUND

Figure 1:
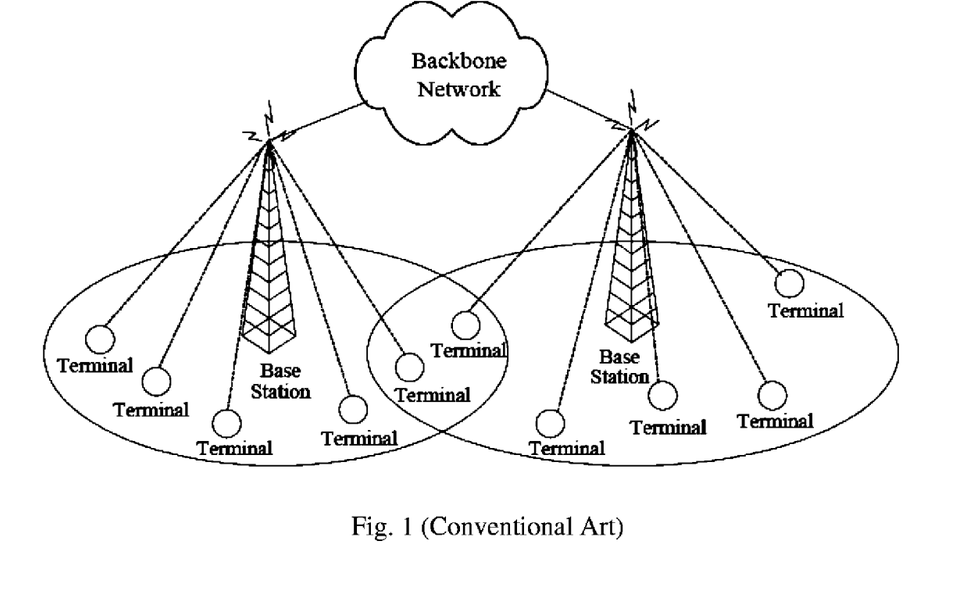
FIG. 1 is a schematic diagram of a network with a point-to-multipoint topology in the conventional art.

A communication network is mainly composed of terminals, base stations, and a core network. The base station implements the functions such as data transfer, resource management and control, etc., for terminals accessing this base station within its coverage area. The base station and terminals serviced by the base station construct a system. The base station may communicate with a terminal via a wired connection, or a wireless connection, and one base station may provide services for multiple terminals. Typically, the topology between the base station and the terminals is point-to-multipoint. In other words, the terminals serviced by the same base station usually exchange information via the base station, rather than communicate with each other directly. As illustrated in FIG. 1, it is a schematic diagram of a network with a point-to-multipoint topology in the conventional art. The topology between the base station and terminals may also be a mesh architecture, and in this case the terminals serviced by the same base station may communicate with each other directly.

Generally, a base station receives only uplink signals transmitted from the terminals serviced by the base station, and does not receive an uplink signal transmitted from a terminal serviced by a neighboring base station. The base stations generally communicate with each other via a wired connection in a backbone network, without occupying the air interface resources. However, in some special occasions, the base station may require a terminal serviced by itself to transmit an uplink signal to a neighboring base station. For example, when the backbone network breaks down, two base stations may communicate with each other by a terminal within the common coverage area. In this case, this terminal serves as a relay station between the two base stations/systems. For a further example, in a cognitive radio system, a base station may require a terminal serviced by the base station to transmit some necessary cognitive signals, such as a base station identification (ID), a terminal ID, etc., to a neighboring base station, so as to determine an interfering neighboring base station and perform corresponding interference negotiation.

In the conventional art, the inter-system communication by a terminal being relayed is performed as follows.

1. The base station (referred to as serving base station hereinafter) providing services for the terminal that implements the relay function (referred to as a relay terminal hereinafter) transmits the information to be relayed to the relay terminal, and allocates relay signal transmission resources for the relay terminal at the same time. The relay signal transmission resources may include a time and frequency resource for transmission, the encoding and modulation schemes, and the transmit power, etc.

2. Upon receiving the information to be relayed (referred to as relay information hereinafter), the relay terminal transmits the relay information to the neighboring base station directly via the allocated time and frequency resource; after the relay information is transmitted, the relay terminal does not determine whether the relay information has been correctly received by the neighboring base station, either.

The inventors discover that in the conventional art described above, because, and the relay terminal is generally located at the edge of the coverage area of the neighboring base station, which suffers significant channel attenuation, the probability of receiving the relay information correctly by the neighboring base station is very low. In addition, because the transmission location, and modulation and encoding methods used for the relay terminal to transmit the uplink signal are allocated by the serving base station, the neighboring base station is unable to know where to receive and how to demodulate and decode the uplink signal from the relay terminal.

SUMMARY

Embodiments of the present disclosure provide methods, systems and apparatuses for implementing inter-system communications, to improve the probability of correct receipt of relay information at the neighboring base station.

The embodiments of the present disclosure are implemented as follows.

A method for implementing inter-system communication includes:

receiving, by a terminal, a neighboring-base-station-access request transmitted from a serving base station, and accessing a neighboring base station as a relay terminal; and receiving, by the relay terminal, relay information, and communicating with the serving base station and the neighboring base station with the relay information.

A method for implementing inter-system communication includes: selecting, by a serving base station, a relay terminal, and transmitting a neighboring base station access request to the relay terminal; and transmitting, the serving base station, relay information to the relay terminal, and communicating with the relay terminal A system for implementing inter-system communication, including: a serving base station, a relay terminal and a neighboring base station.

The serving base station is configured to select the relay terminal, transmit a neighboring base station access request to the relay terminal, transmit relay information to the relay terminal after the relay terminal accesses the neighboring base station, and communicate with the neighboring base station.

The neighboring base station is configured to be accessed by the relay terminal, transmit relay information to the relay terminal, and communicate with the relay terminal.

The relay terminal is configured to receive the neighboring base station access request from the serving base station and access the neighboring base station as a relay terminal, receive the relay information from the serving base station or the neighboring base station, and communicate with the serving base station or the neighboring base station with the relay information.

An apparatus for implementing inter-system communication, including: a neighboring base station access module and a communication module.

The neighboring base station access module is configured to receive a neighboring base station access request from a serving base station, and access a neighboring base station as a relay terminal.

The communication module is configured to receive relay information from the serving base station or the neighboring base station, and communicate with the serving base station or the neighboring base station with the relay information.

In the embodiments of the present disclosure, the relay terminal receives a request for accessing a neighboring base station from the serving base station, and accesses the neighboring base station as a relay; and the relay terminal receives relay information, and communicates with the serving base station and the neighboring base station based on the received relay information. As compared with the conventional art, where the relay terminal performs neither uplink synchronization nor power adjustment with the neighboring base station before transmitting the relay information to the neighboring base station, causing the problem that the neighboring base station has a low rate to receive the relay information correctly. In the embodiments of the present disclosure, the relay terminal accesses the neighboring base station before transmitting the relay information to the neighboring base station, i.e. performing synchronization and power adjustment with the neighboring base station, so as to improve the probability of correct receipt of the relay information at the neighboring base station.

BRIEF DESCRIPTION OF THE DRAWINGS

The exemplary embodiments of the present disclosure will be described below in detail by reference to the accompany drawings, thereby enabling those with ordinary skills in the art to better understand the forgoing and additional features and advantages of the present disclosure. In the drawings.

DETAILED DESCRIPTION

In an embodiment of the present disclosure, a serving base station transmits a access request for a neighboring base station (referred to as a neighboring base station access request hereinafter) to a selected relay terminal; the relay terminal receives the neighboring base station access request and accesses the neighboring base station as a relay terminal After the relay terminal accesses the neighboring base station successfully, the relay terminal receives relay information and communicates with the serving base station and the neighboring base station based on the received relay information.

For the clarity of the purposes, technical schemes and advantages of the present disclosure, the present disclosure is further illustrated in detail below by reference to the drawings and by embodiments.

Figure 2:
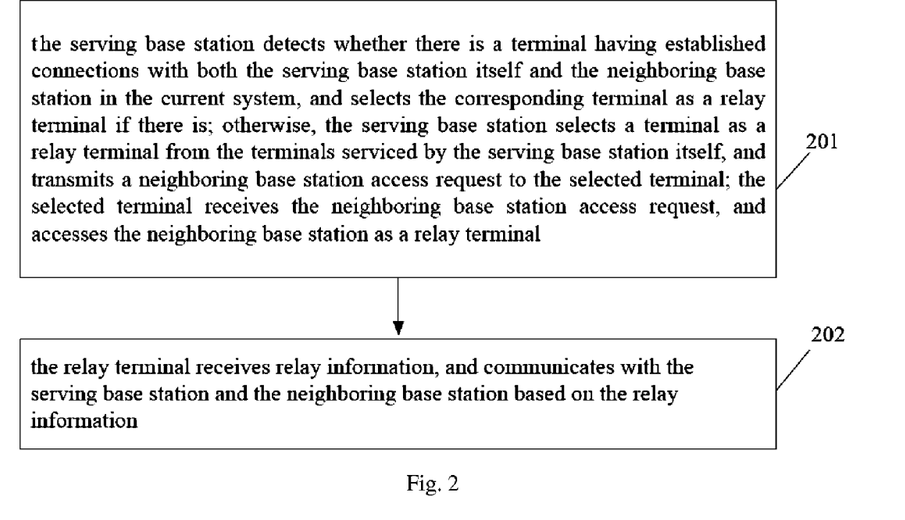
FIG. 2 is a flowchart of a method for implementing inter-system communications according to an embodiment of the present disclosure.

FIG. 2 is a flowchart of a method for implementing inter-system communications according to an embodiment of the present disclosure. As illustrated in FIG. 2, the method includes the following blocks.

Block 201: The serving base station detects whether there is a terminal having established connections with both the serving base station itself and the neighboring base station in the current system, and selects the corresponding terminal as a relay terminal if there is; otherwise, the serving base station selects a terminal as a relay terminal from the terminals serviced by the serving base station itself, and transmits a neighboring base station access request to the selected terminal; the selected terminal receives the neighboring base station access request, and accesses the neighboring base station as a relay terminal The serving base station selects the terminal from the terminals serviced by itself as follows: if a neighboring base station which the serving base station desires to communicate with, is assigned by the serving base station in advance, the serving base station selects a terminal with the comprehensive communication performance satisfying the requirements and within the common coverage area of both the serving base station and the neighboring base station as the relay terminal; otherwise if a neighboring base station, which the serving base station desires to communicate with, is not assigned by the serving base station, the serving base station selects a terminal with the comprehensive communication performance satisfying the requirements and within a common coverage area of both the serving base station and any a neighboring base station as the relay terminal. If possible, the serving base station may select any a terminal within a common coverage area of both the serving base station and any a neighboring base station as relay terminals.

The terminal with the comprehensive communication performance satisfying the requirements discussed herein, may refer to a terminal satisfying the criteria such as having little traffic with the serving base station, having a higher energy of the signals received from the neighboring base station, etc.

After the terminal as a relay terminal is selected, the serving base station transmits a neighboring base station access request to the terminal, and allocates time for accessing the neighboring base station for the terminal at the same time. The principle of allocating the time for accessing the neighboring base station is that the Quality of Service (QoS) of the original services of the terminal will not be affected. The time for accessing the neighboring base station may be a period of continuous time, or may include several periods of time, with the time duration being sufficient for the terminal to perform the whole access process with the neighboring base station, including the synchronization and access process required to transfer data correctly. For example, for a wireless communication system, the required access process includes a downlink physical layer synchronization process, a media access control (MAC) layer synchronization process, a process of acquiring transfer parameters, initial ranging process, and a process for the neighboring base station to allocate a basic connection identification (CID) and a primary management CID for the terminal after the ranging process ends, etc. Hereinafter and optionally, the terminal may further perform capability negotiation, authentication and registration processes with the neighboring base station. Besides the time allocated for accessing the neighboring base station, the terminal may communicate with the serving base station normally. During the access process, the terminal has to notify the neighboring base station that it is a terminal temporarily accessed for relaying information for the inter-system communications, instead of a terminal requesting services from the neighboring base station, so as to avoid the problems such as causing a routing error when the terminal transmits services, due to that the neighboring base station treats the terminal as a terminal to be serviced. Accordingly, during the access process of the terminal, the neighboring base station distinguishes whether the accessing terminal is a relay terminal or an ordinary terminal, so as not to establish a service link for the terminal as a relay terminal The selected terminal, as a relay terminal, accesses the neighboring base station within the time allocated for accessing the neighboring base station. If the access succeeds, The selected terminal as a relay terminal (referred to as a relay terminal hereinafter) transmits a neighboring base station access success message to the serving base station; otherwise if accessing the neighboring base station fails, the relay terminal transmits a neighboring base station failure message to the serving base station. Optionally, the relay terminal may feed back the reason why accessing the neighboring base station fails to the serving base station. The reason may be unable to establish the physical layer synchronization, unable to establish the MAC layer synchronization, unable to acquire the uplink MAC layer parameters, unable to acquire the downlink MAC layer parameters, the ranging process failing, etc. After receiving the neighboring base station failure message transmitted from the relay terminal, the serving base station re-selects a relay terminal according to the selection method mentioned above, or terminates the relay communication.

A terminal may have already finished the access process with a neighboring base station before a neighboring base station access request from the serving base station is received: before the relay communication process starts, the terminals belonging to the serving base station may access the neighboring base stations within the network as relay terminals in initiative within their respective idle periods, and store the corresponding parameters. A terminal may transmit a neighboring base station access success message to its serving base station in initiative. When the inter-system communication is needed, the serving base station may prefer the terminal having already accessed the neighboring base station as the relay terminal. Thus, when the inter-system communication is to be performed, the neighboring base station accessing process is no longer required, thereby saving the access time.

Block 202: The relay terminal receives relay information, and communicates with the serving base station and the neighboring base station based on the relay information.

In this block, the relay information may be received by the relay terminal from the serving base station, or from the neighboring base station. Moreover, after receiving the relay information transmitted from the serving base station or the neighboring base station, the relay terminal may send response information indicating the successful receipt to the serving base station or the neighboring base station, or may not send the response information. However, if the serving base station or the neighboring base station is configured to receive a response message from the relay terminal and does not receive this response message within a predetermined time period, the serving base station or the neighboring base station may retransmit the relay information to the relay terminal; if the relay information has been retransmitted for more than predetermined retransmission number without receiving the response message, then the serving base station re-selects a relay terminal, while the neighboring base station considers the relay request is failed and terminates this communication process.

The serving base station allocates time for inter-system communication for the relay terminal while transmitting the relay information, so as to facilitate the relay terminal to transmit a request message, including a relay request and a neighboring base station access request to the neighboring base station. After receiving the relay information transmitted from the serving base station, the relay terminal requests transmission resource from the neighboring base station, and transmits the relay information on the transmission resource allocated by the neighboring base station. Moreover, the relay terminal maintains the normal communications with the serving base station during this process. After receiving the relay message from the relay terminal successfully, the neighboring base station may or may not send a response message of successful receipt to the relay terminal After receiving the response message of successful receipt from the neighboring base station, the relay terminal may or may not relay the response message to the serving base station.

During the inter-system communications between the serving base station and the neighboring base station via the relay terminal, the relay terminal and the neighboring base station perform the normal ranging process to ensure the transmission quality.

While the relay terminal is communicating with the neighboring base station, if the communication with the neighboring base station is interrupted due to physical layer lost synchronization, MAC layer lost synchronization, or ranging failing, then the relay terminal reports a neighboring base station failure message to the serving base station. After receiving the neighboring base station failure message from the relay terminal, the serving base station re-selects a relay terminal or terminates the communication process.

After the relay terminal accesses the neighboring base station successfully, the neighboring base station may transmit relay information to the relay terminal on its own initiative, requesting the relay terminal to relay the relay information to the serving base station. The relay request process initiated by the neighboring base station is similar to the relay request process initiated by the serving base station, except that the relay terminal may not request additional transmission resources for the relay information from the serving base station, but transmit the relay information on uplink transmission resources allocated to it by the serving base station for other purposes.

During the inter-system communications using the relay terminal, when the traffic of the relay terminal increases traffic and the relay terminal does not have enough time to transfer traffic with the serving base station, the serving base station may terminate the relay function of the relay terminal, and select another serving terminal as the relay terminal After the communication process ends, the serving base station transmits a relay-transmission-end request to the relay terminal. The relay terminal receives and further transmits the relay-transmission-end request to the neighboring base station, which releases the resources allocated to the relay terminal and the context information stored for the relay terminal accordingly. Or, the neighboring base station transmits a relay transmission end request to the relay terminal. The relay terminal receives and further transmits the relay-transmission-end request to the serving base station, which terminates the inter-system communication process accordingly. Or, the neighboring base station or the relay terminal terminates the communication process automatically under certain conditions according to its rules without transmitting the relay transmission end request. For example, if not having communicated with the relay terminal longer than a predetermined time period, the neighboring base station releases the resources allocated for the relay terminal and the context information stored for the relay terminal automatically; or, if not having received the relay information from the serving base station or the neighboring base station longer than a predetermined time period, the relay terminal requires the neighboring base station to release the resources allocated for the relay terminal and the stored context information.

The relay terminal releases the connection established with the neighboring base station and the context information stored for the corresponding connection after the relay transmission end request transmitted from the serving base station or the neighboring base station is received.

When there is more than one relay terminal, it is required to avoid the transmission conflicts between the different relay terminals of the same base station and between the different relay terminals of different base stations.

When the serving base station is to transmit more than one message through the relay terminal, the relay terminal may request the neighboring base station to release the resources allocated for the relay terminal and the stored context information after each relay message is transmitted; or, the relay terminal may request the neighboring base station to release the resources allocated for the relay terminal and the stored context information after all the relay messages have been transmitted.

In an embodiment of the present disclosure, the relay terminal communicates with two base stations, the serving base station and the neighboring base station. Accordingly, the relay terminal needs to maintain two groups of resources allocation parameters and physical layer configuration parameters, including the amount of power adjustment, timing adjustment amount, the frequency adjustment amount and the allocated logic channel numbers of the two base stations. The relay terminal utilizes different parameters when communicating with the two different base stations.

The serving base station and the neighboring base station may operate on the same frequency, or may operate on different frequencies. The relay terminal may communicate with the two base stations in a time division mode or a frequency division mode. However, no matter which communication mode is employed, it requires that the time reserved for the relay terminal is enough for the relay terminal to finish the communications with the neighboring base station, i.e. the inter-system communications, while not affecting the normal service transmissions between the relay terminal and the serving base station.

If the time division mode is employed, the serving base station may randomly or periodically allocate one or more timeslots of one or more frames within a time period to the relay terminal for communicating with the neighboring base station. Or, the serving base station allocates particular time periods to the relay terminal according to the preset rules, for communicating with the neighboring base station, for example, a common signaling interval (CSI), or a common message interval (CMI) or a common control channel (CXCC), etc. Some time division modes are introduced below.

Figure 3:
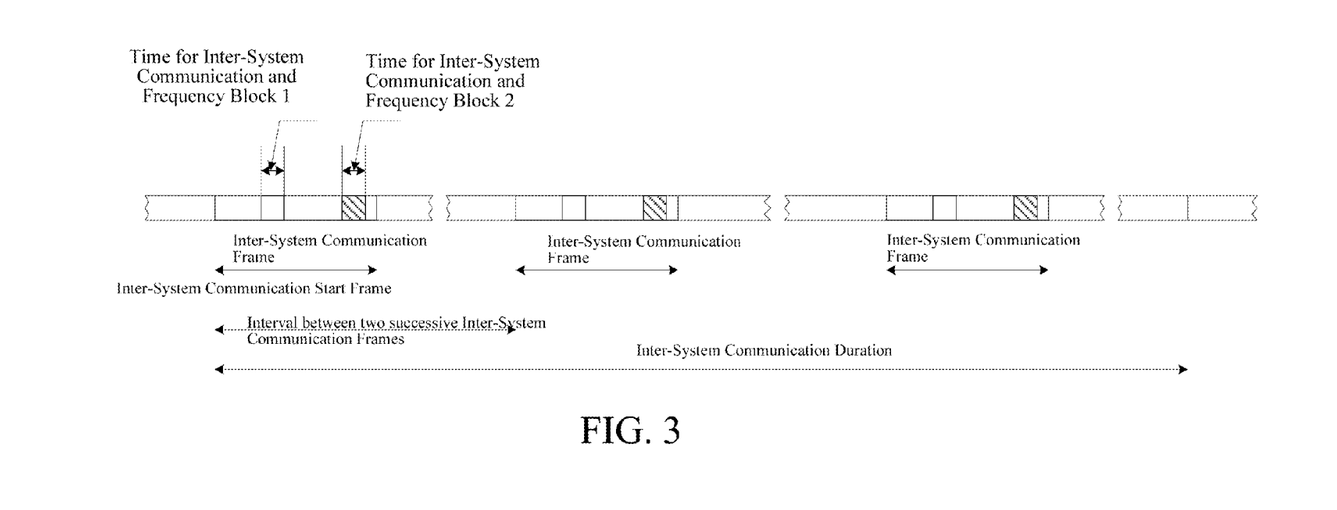
FIG. 3 is a schematic diagram of a time division mode according to an embodiment of the present disclosure.

(1) The serving base station periodically allocates some timeslots of some frames of a certain time period, as illustrated in FIG. 3, which is a schematic diagram of a time division mode in such a case.

The meaning of each notation is as follows:

Inter-system communication start frame: a start frame number allocated to the relay terminal for inter-system communications;

Inter-system communication duration: the frame duration of the inter-system communication process, i.e. in which the relay terminal communicates with both the serving base station and the neighboring base station simultaneously, wherein this duration being set to a special value, such as 0, represents to continue with the inter-system communications in this mode, until the base station terminates the inter-system communications by other means;

Interval between two successive inter-system communication frames: the frame distance between two successive inter-system communication frames including inter-system communication time and frequency blocks;

Inter-system communication time and frequency block: an inter-system communication time and frequency block within each inter-system communication frame, wherein an inter-system communication frame may include one or more inter-system communication time and frequency blocks, and the inter-system communication time and frequency block may be a whole frame.

Figure 4:
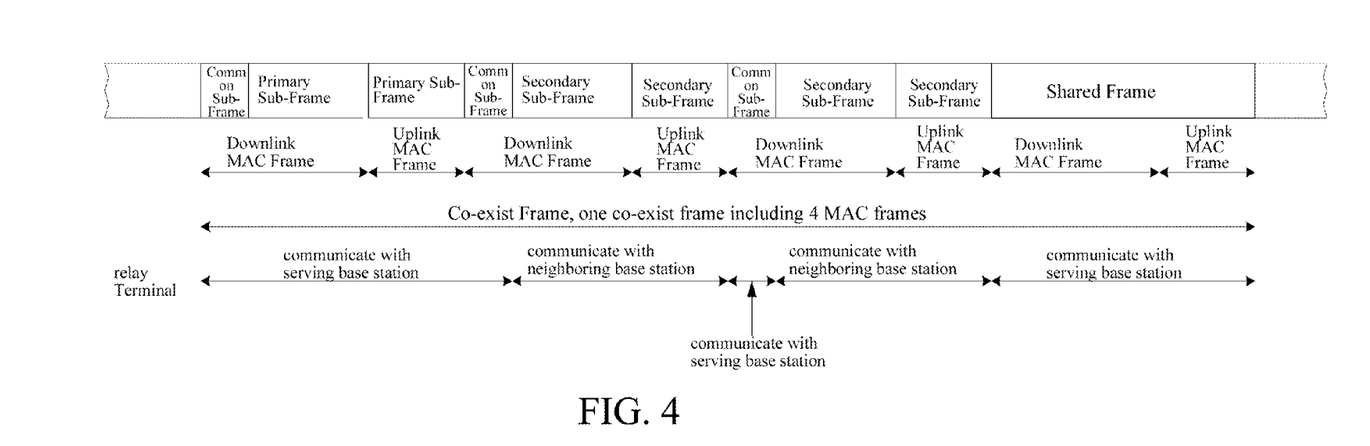
FIG. 4 is a schematic diagram of a time division mode in a wireless communication system according to an embodiment of the present disclosure.

For example, in a wireless communication system, corresponding to the time division mode, the relay terminal may communicate with the serving base station during the master sub-frames of the serving base station and/or the common sub-frames, and communicate with the neighboring base station during the slave sub-frames of the serving base station which is the master sub-frames of the neighboring base station. During the slave sub-frames of the serving base station, the serving base station neither transmits a downlink signal to the relay terminal, nor allocates uplink resources for the relay terminal FIG. 4 is a schematic diagram of a time division mode in a wireless communication system according to an embodiment of the present disclosure.

(2) The serving base station updates the allocation mode of the inter-system communications instantly, i.e. the serving base station may randomly or periodically notify the relay terminal that the inter-system communication time and frequency blocks of the present frame, or the next frame, or the next N frames may be used for inter-system communications. In the time and frequency block used for inter-system communication, the relay terminal may only communicate with the neighboring base station, without communicating with the serving base station. A frame may include one or more inter-system communication time and frequency blocks.

(3) Several fixed timeslots are set, such as the frames starting from 1 s, 2 s, 4 s, 8 s, in certain time periods, such as in each 10 s, for inter-system communications according to preset rules. In these frames, the relay terminal may only communicate with the neighboring base station, without communicating with the serving base station.

If the relay terminal communicates with the two base stations in a frequency division mode, the relay terminal is configured with two transceivers. In addition to the time division and the frequency division modes, the relay terminal may establish the communications with the two base stations by other multiplex method, such as a code division mode, which is not introduced here.

The time division mode above may be applied in various environments, and with respective advantages.

For example, if the relay terminal may receive a frame header or sub-frame header from the neighboring base station within the allocated inter-system communication period, i.e. the relay terminal may synchronize with and access the neighboring base station as an ordinary terminal, the relay terminal synchronizes the downlink physical layer frame by searching the frame header or sub-frame header from the neighboring base station, obtains the corresponding MAC layer information by decoding a message after the frame header or sub-frame header from the neighboring base station, and transmits uplink signals on the uplink resources allocated by the neighboring base station. The neighboring base station may allocate the necessary logic channel number for the relay terminal, such as the basic CID or primary management CID. Meanwhile, the relay terminal indicates that it is a relay terminal while accessing, so as to be distinguished by the neighboring base station. Thus, if the inter-system communication period is the slave sub-frames of the serving base station which is the master sub-frames of the neighboring base station, the relay terminal may periodically communicate with the neighboring base station during the master sub-frames of the neighboring base station, and communicate with the serving base station during the master sub-frames of the serving base station and the common sub-frames. Such time division mode has a good backward compatibility.

If the relay terminal cannot receive the frame header or sub-frame header of the neighboring base station normally during the allocated inter-system communication period, such as in the inter-system communication mode using CXCC timeslots as defined in the wireless communications of this embodiment, the downlink signal transmitted in the downlink CXCC timeslot is not initiated from the frame header of the neighboring base station, and the uplink CXCC timeslot is a little far from downlink CXCC timeslot, about 100 ms. To support the inter-system communications based on synchronization, during the downlink CXCC timeslot, the neighboring base station transmits a downlink inter-system communication message including the preamble and necessary MAC layer information of the neighboring base station, and allocates the initial ranging resources for the relay terminal During the corresponding uplink CXCC timeslot of the neighboring base station, the relay terminal transmits uplink inter-system communication messages following the indication previously received from the downlink CXCC of the neighboring base station. In such a mode, the relay terminal does not synchronize to the frame header or sub-frame header of the neighboring base station, the relay terminal performs the physical layer and MAC layer synchronizations in a downlink CXCC timeslot of the neighboring base station. This mode has a high requirement for the capability of the relay terminal, but is flexible because the relay terminal is not required to establish frame synchronization with the neighboring base station.

The scheme of the present disclosure is further described in detail by reference to a following embodiment.

Figure 5:
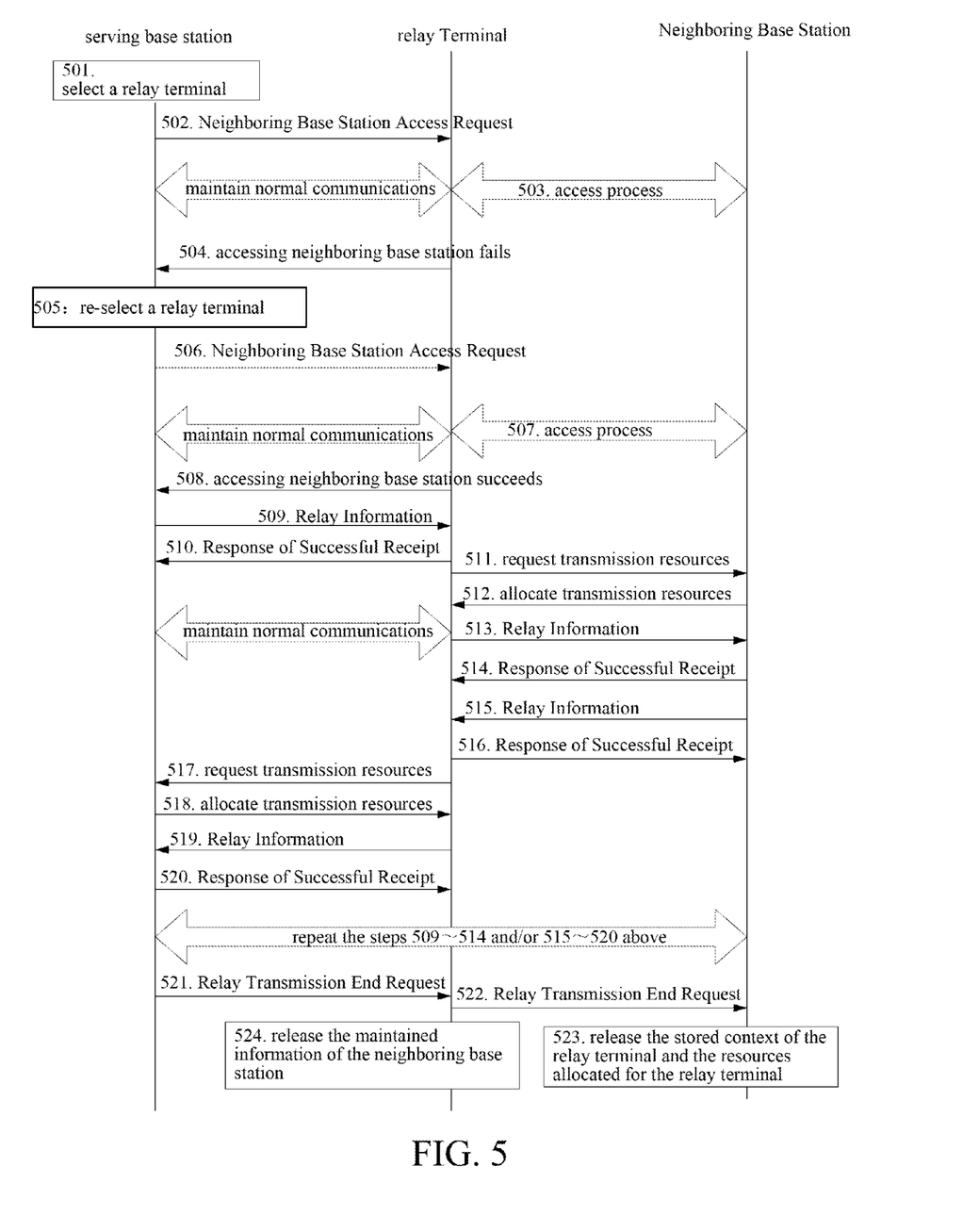
FIG. 5 is a flowchart of a method for implementing inter-system communications according to an embodiment of the present disclosure.

FIG. 5 is a flowchart of a method for implementing inter-system communications according to an embodiment of the present disclosure. In this embodiment, assume that the relay information received by the relay terminal is from the serving base station, and the serving base station selects a relay terminal before initiating the inter-system communications. As illustrated in FIG. 5, the following processes are included.

Block 501: The serving base station selects one or more terminal from the terminals serviced by the serving base station as the relay terminal(s).

In the process of the selection, if the serving base station has specified the neighboring base station for communications, the serving base station selects a proper relay terminal from the terminals within the common coverage area of both the serving base station and the neighboring base station, wherein the selected terminal is able to correctly receive the signals from the serving base station, as well as the signals from the neighboring base station. The serving base station comprehensively considers the traffic conditions of the terminals satisfying the requirements as well as the qualities of the signals received from the neighboring base station, and selects one or more optimal terminals as the relay terminal(s).

If the serving base station has not specified a neighboring base station for communications, the serving base station comprehensively compares the service conditions of the terminals serviced thereby and the available resources, etc., and selects one or more optimal terminals as the relay terminal(s). Because the neighboring base station to communicate with is not specified, during the subsequent process, the selected relay terminal receives the relay information transmitted from the serving base station, and broadcasts the relay information to the neighboring base stations within the network simultaneously. How the neighboring base stations receive the relay information and how to process the information are illustrated in the conventional art, and are not introduced here.

In this embodiment, it is assumed that the serving base station has specified the neighboring base station for communications, and selects one terminal as the relay terminal Block 502: The serving base station transmits a neighboring base station access request to the relay terminal.

Meanwhile, the serving base station allocates access time for neighboring base station (referred to as neighboring base station access time hereinafter) for the relay terminal During this time, the serving base station neither transmits signals to the relay terminal, nor receives uplink signals from the relay terminal Generally, such allocation should not affect the QoS of the normal services of the relay terminal; meanwhile, the allocated neighboring base station access time should be long enough for the relay terminal and the neighboring base station to receive information correctly. The neighboring base station access time may be a period of continuous time, or may include several periods of time. The relay terminal shall maintain the normal communications with the serving base station besides the allocated neighboring base station access time.

Block 503: The relay terminal access the neighboring base station as a relay terminal after the neighboring base station access request is received.

In this block, the relay terminal performs the necessary access process with the neighboring base station during the allocated access time. The access process includes two processes, synchronization process and access process that are necessary for data transfer correctly. Meanwhile, during the access process, the relay terminal notifies the neighboring base station that it is a terminal temporarily accessed for relaying information, rather than a serviced terminal of the neighboring base station.

Block 504: If the process of accessing the neighboring base station in block 503 fails, the relay terminal transmits a neighboring base station failure message to the serving base station.

The relay terminal may feed back the reason why accessing the neighboring base station fails to the serving base station.

Block 505: The serving base station re-selects a relay terminal

The serving base station receives the neighboring base station failure message transmitted from the relay terminal, and selects a new relay terminal in a similar way as that described in block 501. In this block, the serving base station selects the terminal having less optimal comprehensive communication performance as the new relay terminal.

Block 506: The serving base station transmits a neighboring base station access request to the re-selected relay terminal The relay terminal referred to after this block is a terminal different from the relay terminal described in blocks 501-504 (one with the optimal comprehensive communication performance, the other with the less optimal comprehensive communication performance). For convenience of description in this embodiment, the new relay terminal is still referred to as the relay terminal Blocks 507-508: The relay terminal performs the access process with the neighboring base station as a relay terminal, and transmits a neighboring base station access success message to the serving base station after the neighboring base station is accessed successfully.

Blocks 509-510: The serving base station transmits relay transmission information to the relay terminal; the relay terminal transmits response information to the serving base station after the relay transmission information is received successfully.

Meanwhile, the serving base station allocates necessary inter-system communication time for the relay terminal to communicate with the neighboring base station. During this time, the serving base station neither transmits signals to the relay terminal, nor receives uplink signals from the relay terminal Generally, such allocation should not affect the QoS of the normal services of the relay terminal; meanwhile, the inter-system communication time should be long enough for the relay terminal and the neighboring base station to receive information correctly. The inter-system communication time may be a period of continuous time, or may include several periods of time. The relay terminal shall maintain the normal communications with the serving base station outside the allocated inter-system communication time.

Blocks 511-512: The relay terminal requests transmission resources from the neighboring base station, which transmits the transmission resources allocated for the relay terminal to the relay terminal Block 513: The relay terminal transmits the relay information to the neighboring base station through the allocated transmission resources.

Block 514: The neighboring base station transmits response information to the relay terminal after the relay information transmitted from the relay terminal is received successfully, completing a relay process of relaying information from the serving base station to the neighboring base station.

Blocks 509-514 describe the process that the relay terminal receives the relay information from the serving base station, and transmits the relay information to the neighboring base station, so as to achieve communications. As described above, the relay terminal may receive relay information from the neighboring base station, and transmits the relay information to the serving base station, as shown in blocks 515-520.

Blocks 515-516: The neighboring base station transmits relay information to the relay terminal, requesting the relay terminal to forward the relay information to the serving base station; the relay terminal receives the relay information and transmits a response message of successful receipt back to the neighboring base station after.

Blocks 517-520: The relay terminal requests uplink transmission resources from the serving base station while communicating with the serving base station, and transmits the relay information via the allocated uplink transmission resources; the serving base station receives the relay information and transmits a response message of successful receipt to the neighboring base station.

If the serving base station still has relay information to transmit, the blocks 509-514 are repeated; if the neighboring base station still have relay information to transmit, the blocks 515-520 are repeated, until all relay information has been transmitted.

Blocks 521-522: The serving base station transmits a relay transmission end request to the relay terminal, which receives and transmits the relay transmission end request to the neighboring base station.

Block 523: The neighboring base station releases the resources allocated for the relay terminal and the stored context information after the relay transmission end request transmitted from the relay terminal is received.

If desired, block 524 may be further included: the relay terminal releases the maintained information of the neighboring base station.

Figures 6, 7:
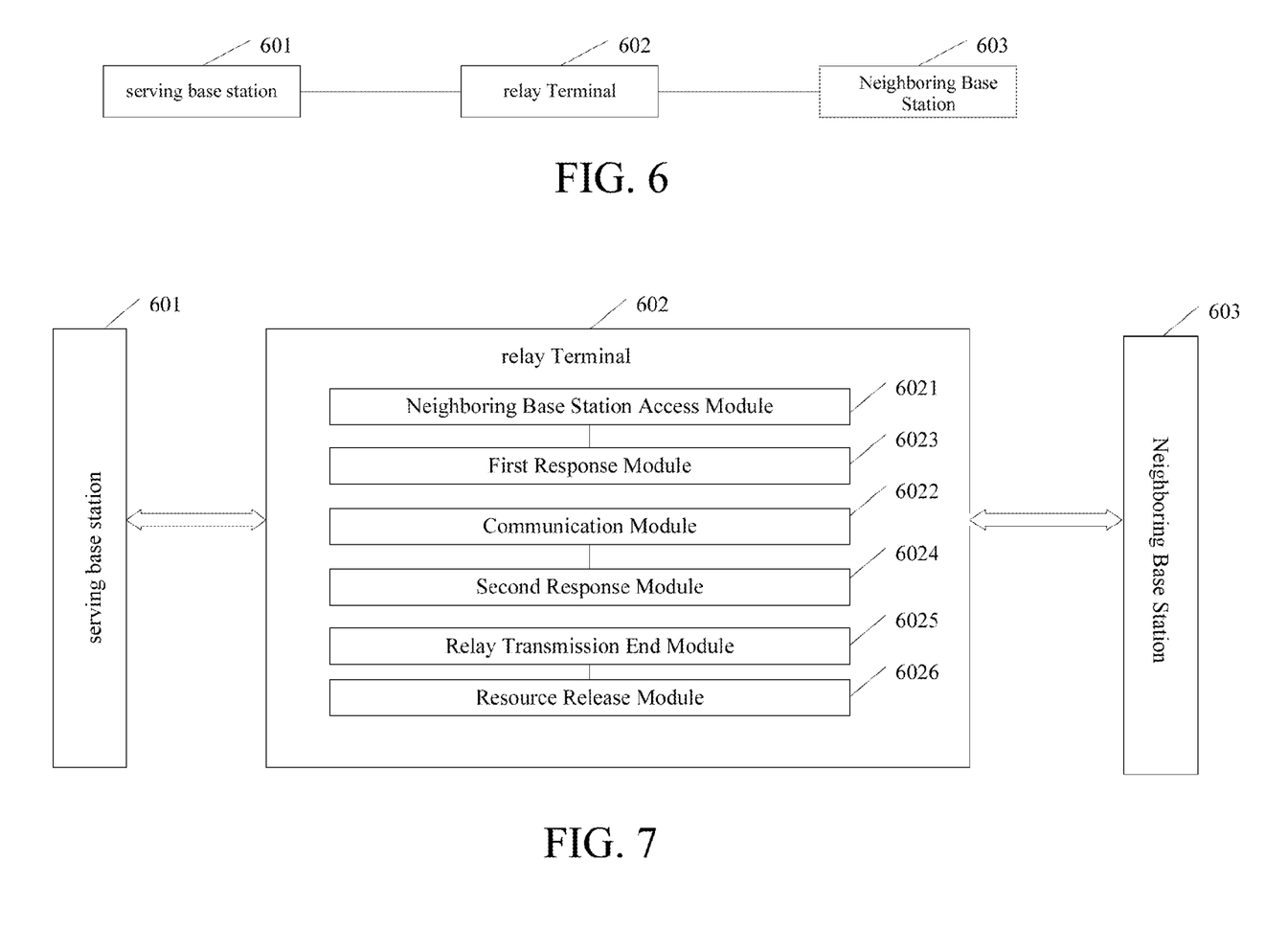
FIG. 6 is a schematic diagram of a system for implementing inter-system communications according to an embodiment of the present disclosure.
FIG. 7 is a schematic diagram of a system for implementing inter-system communications according to an embodiment of the present disclosure.

Based on the method according to embodiments of the present disclosure, FIG. 6 is a schematic diagram of a system for implementing inter-system communications according to an embodiment of the present disclosure. As illustrated in FIG. 6, the system mainly includes a serving base station 601, a relay terminal 602 (refer to a terminal 602 that implements the relay function), and a neighboring base station 603.

The serving base station 601 is configured to detect whether a terminal having established connections with both the serving base station 601 and the neighboring base station 603 exists in the current system, and select the terminal as a relay terminal if it exists; otherwise, to select a terminal from the terminals serviced by the serving base station 601; to transmit a neighboring base station access request to the selected terminal 602; to transmit relay information to the selected terminal 602 after the selected terminal 602 accesses the neighboring base station 603, and communicate with the selected terminal 602 (i.e. the relay terminal 602).

The relay terminal 602 is configured to access the neighboring base station 603 as a relay equipment upon receiving the neighboring base station access request from the serving base station 601, or configured to access the neighboring base station 603 as a candidate relay terminal in initiative, receive the relay information from the serving base station 601 or the neighboring base station 603, and communicate with the serving base station 601 or the neighboring base station 603 based on the relay information.

The neighboring base station 603 is configured to admit an access of the relay terminal 602, transmit relay information to the relay terminal 602, communicate with the relay terminal 602, and communicate with the serving base station 601 via the relay terminal 602.

The serving base station 601 is further configured to receive a neighboring base station access success message or a neighboring base station failure message from the relay terminal 602, and re-select a relay terminal or terminate this communication process upon receiving the neighboring base station failure message.

The serving base station 601 is further configured to receive a response message from the relay terminal 602 indicating successful receipt of the relay information, retransmit the relay information to the relay terminal 602 if this response message is not received within a predetermined time period, and re-select a relay terminal if the relay information has been retransmitted for more than predetermined retransmission times without receiving the response message from the relay terminal 602.

The neighboring base station 603 is further configured to receive a response message from the relay terminal 602 indicating successful receipt of the relay information, retransmit the relay information to the relay terminal 602 if this response message is not received within a preset time period, consider the relay request as failed and terminate the communication process if the relay information has been retransmitted for more than preset retransmission times without receiving the response message from the relay terminal 602.

The serving base station 601 is further configured to transmit a relay transmission end request to the neighboring base station 603 via the relay terminal 602; the neighboring base station 603 is further configured to receive the relay transmission end request from the relay terminal 602, and release the resources allocated for the relay terminal 602 and the stored context information.

Or, the neighboring base station 603 is further configured to transmit a relay transmission end request to the serving base station 601 via the relay terminal 602, and release the resources allocated for the relay terminal 602 and the stored context information; the serving base station 601 is further configured to receive the relay transmission end request from the relay terminal 602.

The relay terminal 602 includes a neighboring base station access module 6021 and a communication module 6022, as illustrated in FIG. 7, which is a schematic diagram of a system for implementing inter-system communications according to a preferred embodiment of the present disclosure.

The neighboring base station access module 6021 is configured to receive a neighboring base station access request from the serving base station 601, and access the neighboring base station 603 as a relay equipment after this neighboring base station access request is received.

The communication module 6022 is configured to receive the relay information from the serving base station 601 or the neighboring base station 603, and communicate with the serving base station 601 or the neighboring base station 603 based on the relay information.

The relay terminal 602 further includes a first response module 6023, configured to monitor the status of the neighboring base station access module 6021, and transmit a neighboring base station access success message to the serving base station 601 if the neighboring base station is accessed successfully; otherwise, transmit a neighboring base station failure message to the serving base station 601.

The relay terminal 602 further includes a second response module 6024, configured to monitor whether the communication module 6022 has successfully received the relay information from the serving base station 601 or the neighboring base station 603, and transmit a response message of successful receipt of the relay information to the serving base station 601 or the neighboring base station 603 after the relay information from the serving base station 601 or the neighboring base station 603 is received successfully.

The relay terminal 602 further includes a relay transmission end module 6025, configured to receive a relay transmission end request from the serving base station 601 and transmit the request to the neighboring base station 603; or configured to receive a relay transmission end request from the neighboring base station 603 and transmit the request to the serving base station 601.

The relay terminal 602 further includes a resources release module 6026, configured to receive a relay transmission end request from the relay transmission end module 6025 and release the link established with the neighboring base station 603 and the context information stored for this link.

In the embodiments of the present disclosure, the serving base station selects a terminal with the optimal comprehensive communication performance as the relay terminal in advance and transmits the relay information to the selected terminal, and synchronizes with the neighboring base station before the relay terminal communicates with the neighboring base station. As compared with the conventional art, in which the relay terminal is located on the edge of the base station, the signal is weak and not synchronized, causing the problem that the neighboring base station has a low rate in receiving the relay information correctly, the schemes described in the embodiments of the present disclosure preferably improve the probability of correct receipt of the relay information at the neighboring base station. In addition, the relay terminal may still in normal communications with the serving base station during the process of communicating with the neighboring base station, as long as a proper communication mode is selected. Also, the schemes described in the embodiments of the present disclosure merely change the existent base stations and terminals slightly, thus having a good backward compatibility.

As described above, the forgoing are merely preferred embodiments of the present disclosure, and are not intended to limit the scope of the present disclosure. Any modifications, alternatives, and improvements, etc., within the spirit and principle of the present disclosure are intended to be embraced within the scope of the present disclosure.

What is claimed is:

1. A system for implementing an inter-system communication, comprising: a serving base station, a relay terminal and a neighboring base station; wherein
   the serving base station is configured to select the relay terminal, transmit a neighboring base station access request to the relay terminal, transmit a first relay information to the relay terminal after the relay terminal accesses the neighboring base station, and communicate with the relay terminal;
   the neighboring base station is configured to admit an access of the relay terminal, transmit a second relay information to the relay terminal, and communicate with the relay terminal; and
   the relay terminal is configured to receive the neighboring base station access request from the serving base station and access the neighboring base station according to the neighboring base station access request, receive the first relay information from the serving base station or the second relay information from the neighboring base station, and communicate with the serving base station or the neighboring base station based on the first relay information or the second relay information correspondingly.

2. The system of claim 1, wherein the serving base station is further configured to receive a neighboring base station access success message or a neighboring base station failure message from the relay terminal, and re-select a relay terminal or terminate the communication if the neighboring base station failure message is received.

3. The system of claim 1, wherein:
   the serving base station is further configured to receive a response message from the relay terminal indicating successful receipt of the first relay information, retransmit the first relay information to the relay terminal if the response message is not received within a predetermined time period, and re-select a relay terminal if the first relay information has been retransmitted for more than predetermined retransmission times without receiving the response message from the relay terminal; and the neighboring base station is further configured to receive a response message from the relay terminal indicating successful receipt of the second relay information, retransmit the second relay information to the relay terminal if the response message is not received within a predetermined time period, and terminate the communication if the second relay information has been retransmitted for more than preset retransmission times without receiving the response message from the relay terminal.

4. The system of claim 1, wherein:

the serving base station is further configured to transmit a relay transmission end request to the neighboring base station via the relay terminal; the neighboring base station is further configured to receive the relay transmission end request from the relay terminal, and release resources allocated for the relay terminal and stored context information; or the neighboring base station is further configured to transmit the relay transmission end request to the serving base station via the relay terminal, and release the resources allocated for the relay terminal and the stored context information; the serving base station is further configured to receive the relay transmission end request from the relay terminal.

5. A method for implementing inter-system communication, comprising:

receiving, by a first terminal, a neighboring base station access request transmitted from a serving base station, and accessing a neighboring base station as a relay terminal; and performing, by the first terminal, at least one further step from the set of steps consisting of:

receiving relay information from the serving base station, and communicating with the neighboring base station based on the relay information; and receiving relay information from the neighboring base station, and communicating with the serving base station based on the relay information;

before the accessing the neighboring base station, the method further comprises: receiving, by the first terminal, neighboring base station access time allocated by the serving base station, and the process of accessing the neighboring base station as a relay terminal comprises: synchronizing with and accessing, by the first terminal, the neighboring base station during the allocated neighboring base station access time.

6. The method of claim 5, wherein the process of synchronizing with and accessing the neighboring base station comprises one of or any combination of the following:

performing, by the first terminal, physical layer synchronization, media access control (MAC) layer synchronization, transfer parameters acquisition, initial ranging process, capability negotiation process, authentication process and registration process with the neighboring base station.

7. The method of claim 5, wherein the process of accessing the neighboring base station further comprises:

notifying, by the first terminal, the neighboring base station that the first terminal access temporarily for relaying information.

8. A method for implementing inter-system communication, comprising:

receiving, by a first terminal, a neighboring base station access request transmitted from a serving base station, and accessing a neighboring base station as a relay terminal; and performing, by the first terminal, at least one further step from the set of steps consisting of:

receiving relay information from the serving base station, and communicating with the neighboring base station based on the relay information; and receiving relay information from the neighboring base station, and communicating with the serving base station based on the relay information;

wherein communicating with the neighboring base station based on the relay information comprises:

requesting, by the first terminal, transmission resources from the neighboring base station after the relay information from the serving base station is received; and transmitting, by the first terminal, the relay information to the neighboring base station via the allocated transmission resources; and wherein communicating with the serving base station based on the relay information comprises:

requesting, by the first terminal, transmission resources from the serving base station after the relay information from the neighboring base station is received; and transmitting, by the first terminal, the relay information to the serving base station via existent uplink transmission resources.

9. The method of claim 8, wherein the first terminal performs a ranging process with the neighboring base station when the first terminal is communicating with the neighboring base station.

10. The method of claim 8, wherein the process of communicating with the serving base station or the neighboring base station further comprises:

reporting, by the first terminal, to the serving base station of a neighboring base station failure message if the first terminal's communication with the neighboring base station is interrupted due to physical layer lost synchronization, MAC layer lost synchronization, or ranging failing, so that the serving base station re-selects a second terminal as a relay terminal or terminates the communication after the neighboring base station failure message transmitted from the first terminal is received.

11. The method of claim 8, wherein the process of communicating with the serving base station or the neighboring base station further comprises:

receiving, by the first terminal, a relay transmission end request; and transmitting the relay transmission end request to the neighboring base station, so that the neighboring base station releases resources allocated for the first terminal and context information stored for the first terminal; or terminating, by the first terminal, the communication automatically according to a preset rule if a requirement is satisfied.

12. The method of claim 11, wherein the process of communicating with the serving base station or the neighboring base station further comprises:

requesting, by the first terminal, the neighboring base station to release the resources allocated for the first terminal and the stored context information after each relay message is transmitted if the first terminal receives multiple relay messages; or, requesting the neighboring base station to release the resources allocated for the first terminal and the stored context information after all the relay messages are transmitted.

13. The method of claim 8, wherein:

the first terminal communicates with the serving base station or the neighboring base station by: communicating, by the first terminal, with the serving base station or the neighboring base station in a time division mode or a frequency division mode;

if a time division mode is employed, the serving base station randomly or periodically allocates more than one timeslot of more than one frame within a time period to the first terminal, wherein the timeslot is used by the first terminal for communicating with the neighboring base station; or the serving base station allocates a particular time period to the first terminal according to a predetermined rule, wherein the particular time period is used by the first terminal for communicating with the neighboring base station.

* * * * *